US010021591B2

(12) United States Patent
Xu et al.

(10) Patent No.: US 10,021,591 B2
(45) Date of Patent: Jul. 10, 2018

(54) LIMITING ACCESS TO SERVICE PROVIDERS BASED ON THE NETWORK TRAFFIC LOAD OF A WIRELESS ACCESS POINT

(71) Applicant: HEWLETT-PACKARD DEVELOPMENT COMPANY, L.P., Fort Collins, CO (US)

(72) Inventors: Xunteng Xu, Beijing (CN); Jun Qing Xie, Beijing (CN)

(73) Assignee: Hewlett Packard Enterprise Development LP, Houston, TX (US)

( * ) Notice: Subject to any disclaimer, the term of this patent is extended or adjusted under 35 U.S.C. 154(b) by 144 days.

(21) Appl. No.: 14/762,941

(22) PCT Filed: Jan. 24, 2013

(86) PCT No.: PCT/CN2013/070918
§ 371 (c)(1),
(2) Date: Jul. 23, 2015

(87) PCT Pub. No.: WO2014/113948
PCT Pub. Date: Jul. 31, 2014

(65) Prior Publication Data
US 2015/0373579 A1    Dec. 24, 2015

(51) Int. Cl.
*H04W 84/12* (2009.01)
*H04L 1/00* (2006.01)
(Continued)

(52) U.S. Cl.
CPC ....... *H04W 28/0289* (2013.01); *H04W 24/08* (2013.01); *H04W 28/0205* (2013.01);
(Continued)

(58) Field of Classification Search
CPC ..... H04W 28/02; H04W 24/08; H04W 48/16; H04W 40/20; H04W 36/08; H04W 76/02;
(Continued)

(56) References Cited

U.S. PATENT DOCUMENTS 7,162,250 B2    1/2007  Misra
7,433,309 B2 *  10/2008 Rue .................. H04L 12/24
                                                    370/232
(Continued)

FOREIGN PATENT DOCUMENTS

CN      102572973 A    7/2012
CN      102802232 A    11/2012
CN      102893653 A    1/2013

OTHER PUBLICATIONS

International Searching Authority, International Search Report and Written Opinion, PCT Application No. PCT/CN2013/070918, dated Oct. 31, 2013, 10 pages.
Haidar, M., Dynamic Load Balancing and Channel Allocation in Indoor Wireless Local Area Networks, (Research Paper), Nov. 2005, 21 Pgs.
Kulkarni, P. et al., Exploiting Overlap for Provisioning of Access Points in Wireless Networks, (Research Paper), 2004, 13 Pgs.
(Continued)

*Primary Examiner* — Edan Orgad
*Assistant Examiner* — Vanneilian Lalchinthang
(74) *Attorney, Agent, or Firm* — Mahamedi Paradice LLP

(57) ABSTRACT

A wireless access point can identify a group of service providers that can provide access for respective subscriber devices. The wireless access point can periodically monitor its network traffic load. In response to determining that the amount of the network traffic load is above a threshold amount, the wireless access point selects one or more service providers from the group, and impedes use of each of the selected one or more service providers from the wireless access point by one or more additional subscriber devices that have not yet connected to the wireless access point.

17 Claims, 4 Drawing Sheets

(51) Int. Cl.
*H04W 48/18* (2009.01)
*H04W 28/02* (2009.01)
*H04W 48/06* (2009.01)
*H04W 24/08* (2009.01)
*H04W 48/16* (2009.01)

(52) U.S. Cl.
CPC ....... *H04W 28/0231* (2013.01); *H04W 48/06* (2013.01); *H04W 48/16* (2013.01)

(58) Field of Classification Search
CPC . H04L 29/08; H04L 67/2871; H04L 67/2838; H04B 7/024
USPC ......................................................... 370/230
See application file for complete search history.

(56) References Cited

U.S. PATENT DOCUMENTS

| | | |
|---|---|---|
| 7,836,181 B2 | 11/2010 | Bejerano et al. |
| 8,000,716 B2 | 8/2011 | Tsao et al. |
| 2003/0187956 A1* | 10/2003 | Belt .................... H04L 67/2823 709/219 |
| 2014/0023059 A1* | 1/2014 | Gupta ................. H04W 36/34 370/338 |
| 2014/0171078 A1* | 6/2014 | Ryerson ................ H04W 48/18 455/435.2 |

OTHER PUBLICATIONS

Wi-Fi Roaming—Building on ANDSF and Hotspot2.0, (Research Paper), Retrieved Nov. 9, 2017, 45 Pgs.

* cited by examiner

LIMITING ACCESS TO SERVICE PROVIDERS BASED ON THE NETWORK TRAFFIC LOAD OF A WIRELESS ACCESS POINT

BACKGROUND

Wireless local area networks (WLANs) have been widely used to provide access to the Internet and other networks. As WLAN access points increase in different areas, WLAN users can select, from multiple possible access points, which access point to associate his or her device with. In many cases, a WLAN user may select the access point having the strongest received signal strength indicator (RSSI). This conventional approach can, however, lead to inefficient use of wireless network resources. For example, although an access point having the strongest RSSI may be closest to the WLAN user, the access point may provide slow or poor service due to a high number of users that are currently connected to the access point.

DETAILED DESCRIPTION

Figure 1:
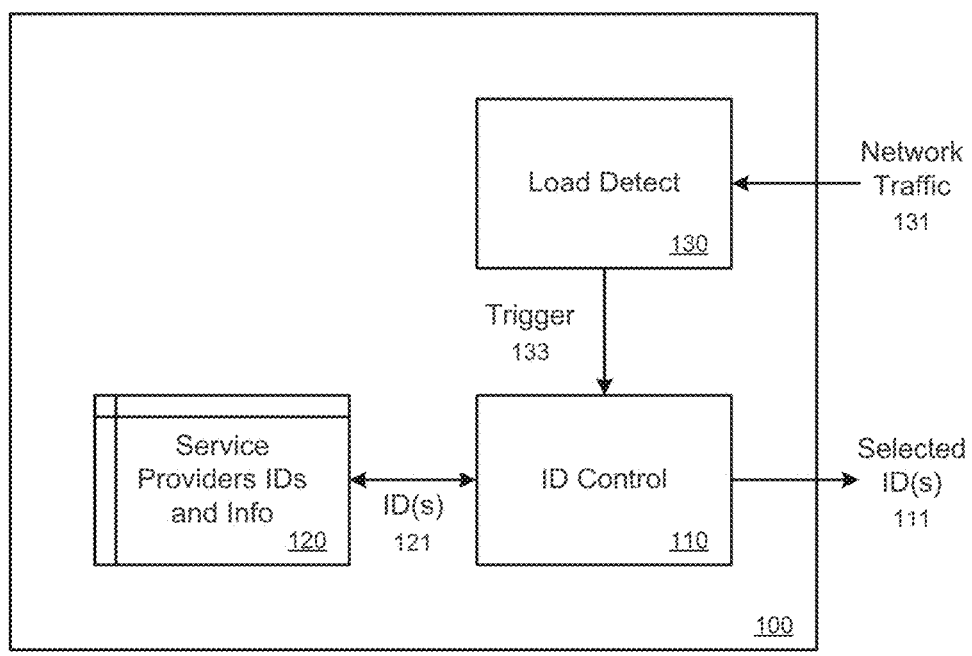
FIG. 1 illustrates an example system for operating a wireless access point.

Examples described herein provide for a system and method to provide network efficiency among wireless access points (APs). In some implementations, network throughput can be maximized by balancing the load (e.g., amount of traffic in a wireless system or device) among APs within the same service provider.

In one implementation, a wireless AP can identify a group of service providers that can provide access for respective customer or subscriber devices (e.g., stations) via the wireless AP. For example, the wireless AP can maintain (or have access to) a list of identifiers of service providers. The wireless AP can periodically monitor (or intermittently monitor, if based on a monitoring schedule) its network traffic load and determine when an amount of the network traffic load is above a threshold amount. In response to determining that the amount of the network traffic load is above the threshold amount, the wireless AP can select one or more service providers from the group, and impede use of each of the selected one or more service providers from the wireless AP by one or more additional subscriber devices that have not yet connected to the wireless AP.

As described herein, "impeding use" can refer to precluding, limiting, or hindering access to. For example, a service provider can be impeded from use by a respective subscriber device by precluding or limiting access to the service provider at a wireless AP.

In some cases, two or more service providers can be part of a roaming consortium, in which the service providers have one or more agreements in place with each other to allow one service provider to have access to a wireless AP maintained by another service provider, and vice versa. Information of which service providers are part of the roaming consortium can be included and maintained in a roaming consortium list. A wireless AP can access the roaming consortium list when selecting which service provider(s) are to be impeded for use by subscriber devices that have not yet connected to the wireless AP.

Still further, in some examples, the wireless AP can monitor its network traffic load by monitoring, for a duration of time, a channel (e.g., at a particular frequency bandwidth) that the wireless AP has selected to operate in. The wireless AP can determine when the amount of the network traffic load is above the threshold amount by determining how much (e.g., what percentage) of the channel is occupied during the duration of time. In other examples, the wireless AP can monitor its network traffic load by determining a total amount of data being transmitted and/or received by the wireless AP.

Depending on implementations, once the wireless AP selects which service provider(s) is to be impeded from use by one or more additional subscriber devices that have not yet connected to the wireless AP, the wireless AP can broadcast a beacon frame having a set of identifiers that exclude the selected identifier(s) of service provider(s) that have been selected to be precluded or limited from being accessed. In this manner, the wireless AP can dynamically change the broadcasting roaming consortium information based on its network traffic load. In another implementation, instead of broadcasting a beacon frame, the wireless AP can receive a probe request from a subscriber device that has not yet connected to the wireless AP, and respond to the probe request by transmitting a response frame having a set of identifiers that exclude the selected identifier(s) of service provider(s) that have been selected to be precluded or limited from being accessed.

As used herein, the terms WLAN and Wi-Fi can include communications governed by the IEEE 802.11 family of standards, Bluetooth, HiperLAN (a set of wireless standards, comparable to the IEEE 802.11 standards, used primarily in Europe), and other technologies having relatively short radio propagation range.

One or more examples described herein provide that methods, techniques, and actions performed by a computing device are performed programmatically, or as a computer-implemented method. Programmatically, as used herein, means through the use of code or computer-executable instructions. These instructions can be stored in one or more memory resources of a computing device or a wireless access point. A programmatically performed step may or may not be automatic.

One or more examples described herein can be implemented using programmatic modules or components. A programmatic module or component can include a program, a sub-routine, a portion of a program, or a software component or a hardware component capable of performing one or more stated tasks or functions. As used herein, a module or component can exist on a hardware component independently of other modules or components. Alternatively, a module or component can be a shared element or process of other modules, programs or machines.

Some examples described herein can generally require the use of computing devices, including processing and memory resources. Examples described herein may be implemented, in whole or in part, on computing devices, such as wireless APs, desktop computers, cellular or smart phones, laptop computers, servers, or routers. Memory, processing, and network resources may all be used in connection with the establishment, use, or performance of any example described herein (including with the performance of any method or with the implementation of any system).

Furthermore, one or more examples described herein may be implemented through the use of instructions that are executable by one or more processors. These instructions may be carried on a computer-readable medium. Machines shown or described with figures below provide examples of processing resources and computer-readable mediums on which instructions for implementing examples described herein can be carried and/or executed. In particular, the numerous machines or devices shown with examples herein include processor(s) and various forms of memory for holding data and instructions. Examples of computer-readable mediums include permanent memory storage devices, such as hard drives on personal computers or servers. Other examples of computer storage mediums include portable storage units, such as CD or DVD units, flash memory (such as carried on smart phones, multifunctional devices or tablets), and magnetic memory. Computers, terminals, network enabled devices (e.g., mobile devices, wireless APs) are all examples of machines and devices that utilize processors, memory, and instructions stored on computer-readable mediums. Additionally, some examples may be implemented in the form of computer-programs, or a computer usable carrier medium capable of carrying such a program.

System Description

FIG. 1 illustrates an example system for operating a wireless access point. A system 100, such as described by an example of FIG. 1, can be implemented in a variety of computing environments. For example, some or all of the components of system 100 can be implemented through a combination of servers, wireless APs, or other network-enabled computing devices. In one example, system 100 can be implemented on a wireless AP so that the wireless AP can automatically perform one or more steps to impede use of (e.g., preclude or limit access to) a service provider(s) that provide network access for respective subscriber devices or stations based on the amount of network traffic load of the wireless AP.

In one implementation, system 100 includes an identifier (ID) control 110, service provider ID (and roaming information) database(s) 120, and a load detect 130. The ID control 110, the service provider ID database 120, and the load detect 130 combine to dynamically control the network throughput of a wireless AP based on the network traffic load of the wireless AP. In some variations, the components that are described in system 100 can be each provided as individual components or modules, or as part of other components. Logic can be implemented with various applications (e.g., software) and/or with hardware of a computing device that implements system 100.

In one example, system 100 can be implemented on a wireless AP that allows one or more computing devices (e.g., stations) to connect to a network. The wireless AP can operate under a standard, such as the IEEE 802.11 family of standards, for exchanging data with connected stations. The wireless AP can implement system 100 to control its network traffic or throughput when one or more stations are associated and connected to the wireless AP.

According to one or more implementations, the wireless AP may be operated and controlled by a particular subscription service provider. The service provider can operate a plurality of wireless APs in a given area or region, such as a public area, shopping center, city locale, etc., to enable subscriber stations (e.g., devices operated by users who pay for subscription) to have access to a network or the Internet, and services provided therewith. In some cases, the service provider that operates the wireless AP can be part of a roaming partnership or consortium. A roaming consortium can be two or more service providers having an agreement in place to allow the service providers to share access to one or more of each other's wireless APs. In this manner, multiple service providers may be accessible through a single wireless AP. For example, wireless AP 1 may be operated and controlled by Service Provider 1, but because Service Provider 1 and Service Provider 2 have a roaming agreement with each other, wireless AP 1 can allow stations that subscribe to Service Provider 2 to also access the network using wireless AP 1. Accordingly, computing devices or stations that subscribe to different service providers may have access to a network or the Internet using the same wireless AP.

System 100 can store information about the roaming consortium (e.g., information about the agreements, which service providers are part of the consortium) and can also store a list or table of service provider identifiers (which correspond to service providers that can provide access for respective subscriber stations via the wireless AP) in the service provider ID database 120. The ID control 110 can communicate (e.g., via a network interface of the wireless AP) with one or more WLAN servers or controllers in order to update and/or maintain the roaming consortium information and service provider IDs 121 stored in the service provider ID database 120. For example, if another service provider joins the roaming consortium, an ID of the newly joined service provider can be added to the service provider ID database 120 and information about the roaming agreements can be updated.

The ID control 110 can also rank or prioritize the service provider IDs 121 based, at least in part, on one or more agreements specified for the roaming consortium. The ID control 110 can also rank or prioritize a service provider over another based on other parameters, such as the amount of network traffic assigned to a service provider. In this manner, the ID control 110 can access the service provider ID database 120 in order to identify and/or select which service provider IDs 121 are to be transmitted or broadcasted based on the amount of network traffic load of the wireless AP.

In one example, the load detect 130 can monitor and measure the network traffic load of the wireless AP. Depending on implementation, the load detect 130 can periodically monitor the network traffic load and/or monitor the network traffic load based on a schedule set by an operator or administrator of the wireless AP. For example, system 100 can communicate over a network (e.g., wirelessly or using a wireline), via a network interface (not illustrated in FIG. 1), to communicate with one or more computing devices or stations, such as mobile computing devices or smartphones, one or more system servers or controllers, or one or more other wireless APs. The load detect 130 can monitor the network traffic 131 of one or more network interfaces of the wireless AP in order to determine whether an amount of the network traffic load exceeds (or is equal to) a threshold amount.

In one implementation, the load detect 130 can monitor the network traffic load of the AP by monitoring, for a duration of time, a channel (e.g., at a particular frequency bandwidth) that the wireless AP has selected to operate in. The load detect 130 can determine when the amount of the network traffic load is above the threshold amount (e.g., which can be a percentage of channel occupancy, such as 75 percent) by determining how much (e.g., what percentage) of the channel that the wireless AP is operating in is occupied during the duration of time. In another example, the load detect 130 can monitor the network traffic load by determining a total amount of data (e.g., in bytes) being transmitted and/or received by the wireless AP and compare it with the threshold amount (e.g., which can be in bytes).

In some variations, the threshold amount can be configured by the operator or administrator of the wireless AP. As an addition or variation, the threshold amount can be selected based on the roaming consortium (e.g., based on one or more agreements entered into between one or more service providers). Based on the network traffic load of the wireless AP detected by the load detect 130, the ID control 110 can place or operate system 100 (and accordingly, the wireless AP) in different modes.

For example, when the load detect 130 determines that the amount of the network traffic load of the wireless AP is above (and/or equal to) the threshold amount of the traffic load for the wireless AP, the load detect 130 can provide a trigger 133 to the ID control 110 to notify the ID control 110 that the wireless AP is operating in a high-load state (e.g., as opposed to a low-load state where the amount of the network traffic load is less than the threshold amount). The trigger 133 can cause the ID control 110 to switch operating modes so that the wireless AP switches from a low-load mode to a high-load mode. The high-load mode can indicate to system 100 that the wireless AP has a high number of devices or stations that are connected to it and/or that the total traffic amount (including upload and/or download traffic) via the wireless AP is congested so that connections to the wireless AP by additional stations that have not yet connected to the wireless AP would be detrimental to the network efficiency of the wireless AP.

Once switched to the high-load mode, the ID control 110 can automatically implement one or more steps to limit access to one or more service providers at the wireless AP (i.e., to prevent one or more additional stations from associating with the wireless AP). In one implementation, the ID control 110 can impede use of a service provider by selecting one or more service provider IDs from the roaming consortium list to be precluded from being transmitted or broadcasted to nearby stations that have not yet been connected to the wireless AP. The ID control 110 can select which service provider IDs to impede use of based on various factors such as, for example, local policy and implementation, the ranking (based on importance or revenue), subscriber number, specific roaming agreement details, and/or the roaming consortium.

As the load detect 130 periodically monitors the network traffic 131 of the wireless AP, the load detect 130 can dynamically adjust the trigger 133 based on the determination. In this manner, when the load detect 130 determines that the amount of the network traffic load of the wireless AP has changed to be less than the threshold amount, for example, the load detect 130 can provide the trigger 133 to the ID control 110 to notify the ID control 110 that the wireless AP is now operating in a low-load mode (and vice versa).

As an addition or an alternative, the wireless AP can be placed or switched into more than two modes. For example, two different threshold amounts may be configured for system 100, such as a first threshold amount and a second threshold amount, where the first threshold amount is less than the second threshold amount. If the load detect 130 detects that the amount of the network traffic load of the wireless AP is less than the first threshold amount, the ID control 110 can switch (or operate) the wireless AP in a first mode (e.g., a low-load mode). If the load detect 130 detects that the amount of the network traffic load of the wireless AP is less than the second threshold amount but greater than the first threshold amount, the ID control 110 can operate in a med-load mode. If the load detect 130 detects that the amount of the network traffic load of the wireless AP is greater or equal to the second threshold amount, the ID control 110 can operate in a high-load mode.

Based on the amount of the network traffic load of the wireless AP detected by the load detect 130, the ID control 110 can determine which service provider IDs 121 to select from the roaming consortium list in order to broadcast or transmit to stations that have not yet connected to the wireless AP.

Depending on implementation, the wireless AP can enable stations that use passive scanning and/or active scanning to associate and connect to it. In one example, the wireless AP can transmit or broadcast a beacon frame to advertise the presence of a WLAN, Stations that use passive scanning can detect the beacon frame and transmit a response frame back to the wireless AP to establish a wireless communication channel or link with the wireless AP. The ID control 110 can access the service provider ID database 120 to enable the wireless AP to transmit, with or as a part of the beacon frame, one or more service providers IDs 111 that may be accessible through the wireless AP (as a result of the roaming consortium agreement(s)). In this manner, subscriber stations that have not yet connected to the wireless AP can identify which service providers are accessible via the wireless AP from the identifiers received from the beacon frame and can connect to the wireless AP provided that the station is a subscriber to at least one of such service providers.

In another example, the wireless AP can receive a probe request or message from stations that are actively scanning for WLANs. The wireless AP can receive a probe request from a station and respond to the probe request by transmitting a response frame back to the station. The ID control 110, in this example, can access the service provider ID database 120 to enable the wireless AP to transmit, with or as part of the response frame, one or more service providers IDs 111 that may be accessible through the wireless AP. Similarly, the station that provided the probe request can identify which service providers are accessible via the wireless AP from the identifiers received from the response frame and can connect to the wireless AP provided that the station is a subscriber to at least one of such service providers.

In either case, the ID control 110 can provide one or more selected service provider IDs 111 (e.g., a first set of IDs) as part of the beacon frame and/or the response frame when operating in a low-load mode. For example, the ID control 110 can provide one, some, all, or the top three ranked service provider IDs from the roaming consortium list to nearby stations that have not yet connected to the wireless AP. In the high-load mode, the ID control 110 can select and exclude one or more service provider IDs 111 from being transmitted, so that a second set of IDs are provided as part of the beacon frame and/or the response frame. By providing only a second set of IDs (where the second set of IDs include a fewer number of service provider IDs than the first set of IDs), certain subscriber stations that have not yet connected to the wireless AP may be prevented from doing so, provided that the service provider ID that a respective station subscribes to does not appear in the beacon frame and/or the response frame. In another example, in the high-load mode, the ID control 110 can hide or exclude all service provider IDs 111 from the roaming consortium list (or all service providers other than the service provider that operates the wireless AP) from being transmitted as part of the beacon frame and/or the response frame. In this manner, the ID control 110 can reduce the possibility of stations connecting to it and prevent the traffic load at the wireless AP from increasing when the wireless AP is already operating in a high-load (or overloaded) mode.

As an alternative or addition, the service provider ID database 120 can also include additional information (e.g., in addition to the roaming consortium list) for identifying service providers (to stations) that are accessible through the wireless AP. For example, the service provider ID database 120 can also include 3rd Generation Partnership Project (3GPP) cellular network information and/or an network access identifier (NAI) Realm list. The 3GPP cellular network information can include cellular information, such as network advertisement information (e.g., network codes and/or country codes) to assist a 3GPP station in selecting a wireless AP to access a 3GPP network. The NAI Realm list can be a list of NAI realms corresponding to service providers or other entities whose networks or services are accessible via the wireless AP. Each of the 3GPP cellular network information and/or the NAI Realm list can be accessed by the ID control 110. The ID control 110 can select identifiers from the 3GPP cellular network information and/or the NAI Realm list to be provided as part of the beacon frame and/or the response frame. For example, based on whether the amount of the network traffic load of the wireless AP is greater or less than a threshold amount (similar to the method described with one or more service provider IDs of a roaming consortium list), the ID control 110 can operate in a low-load mode or a high-load mode to broadcast or transmit either a first set or second set of identifiers from the 3GPP cellular network information and/or the NAI Realm list.

In other examples, system 100 can be implemented as part of a controller or WLAN server, that is connected to (e.g., via a wireline or wirelessly) a plurality of wireless APs. The controller (or a wireless AP that is selected to act as the controller, for example) for a set of wireless APs can implement system 100 (or a portion of system 100) to receive network traffic load information from each of the wireless APs. The load detect 130 monitors the network traffic load information from the wireless APs to determine which AP has an amount of network traffic load that is greater than the threshold amount. By using the network traffic load information provided by the wireless APs, the load detect 130 can determine which APs are operating in a low-load mode and which APs are operating in a high-load mode (e.g., according to the example of a two mode system), and trigger the ID control 110 to instruct the wireless APs appropriately. For example, the controller can instruct one or more of the wireless APs that are overloaded to dynamically adjust the roaming consortium list by precluding one or more service provider IDs from being transmitted to nearby stations. In another implementation, the controller can also instruct one or more wireless APs that are underloaded (e.g., in the low-load mode) to perform steps to increase the possibility of stations connecting to it (e.g., select additional service provider IDs to be transmitted as part of the beacon frame and/or the response frame).

In one implementation, system 100 can utilize a Wi-Fi Alliance Technical Committee standard, such as Hotspot 2.0, to perform load controlling in a wireless AP (or in a network of wireless APs). For example, the goal of Hotspot 2.0 is to provide a cellular-network-like end-user experience to Wi-Fi authentication and roaming (e.g., the user would not have to know or figure out which AP his or her device is associated with, similar to the user not knowing which cellular base station the device is connected to). A wireless AP that utilizes Hotspot 2.0 can provide extra information about the wireless AP and its backbone service provider before association.

In addition, Hotspot 2.0 is built on the IEEE 802.11 family of standards, such as the 802.11u specification, which provides query mechanisms to enable stations to discover information about the roaming partners available on a wireless AP. In one example, the IEEE 802.11u allows for a new Public Action Frame based Generic Advertisement Service (GAS) that allows unauthenticated devices to query a wireless AP of its capabilities and supported service providers before associating. A station (such as a Hotspot 2.0 client) may use the GAS procedures to retrieve more detailed information, such as 3GPP cellular network information, NAI Realm list, or the roaming consortium list, before making its association decision. By utilizing Hotspot 2.0, based on the network traffic load of the wireless AP, service provider information (such as the service provider IDs from the roaming consortium list or identifiers from 3GPP cellular network information and/or the NAI Realm list) can be selected (e.g., selected for exclusion) and provided by the wireless AP with or as part of the response frame under the GAS procedures. In some cases, by using the benefits of Hotspot 2.0, system 100 can be implemented on the wireless AP(s) and/or the controller without requiring modifications (to software or hardware) to individual mobile devices or stations.

Methodology

Figure 2:
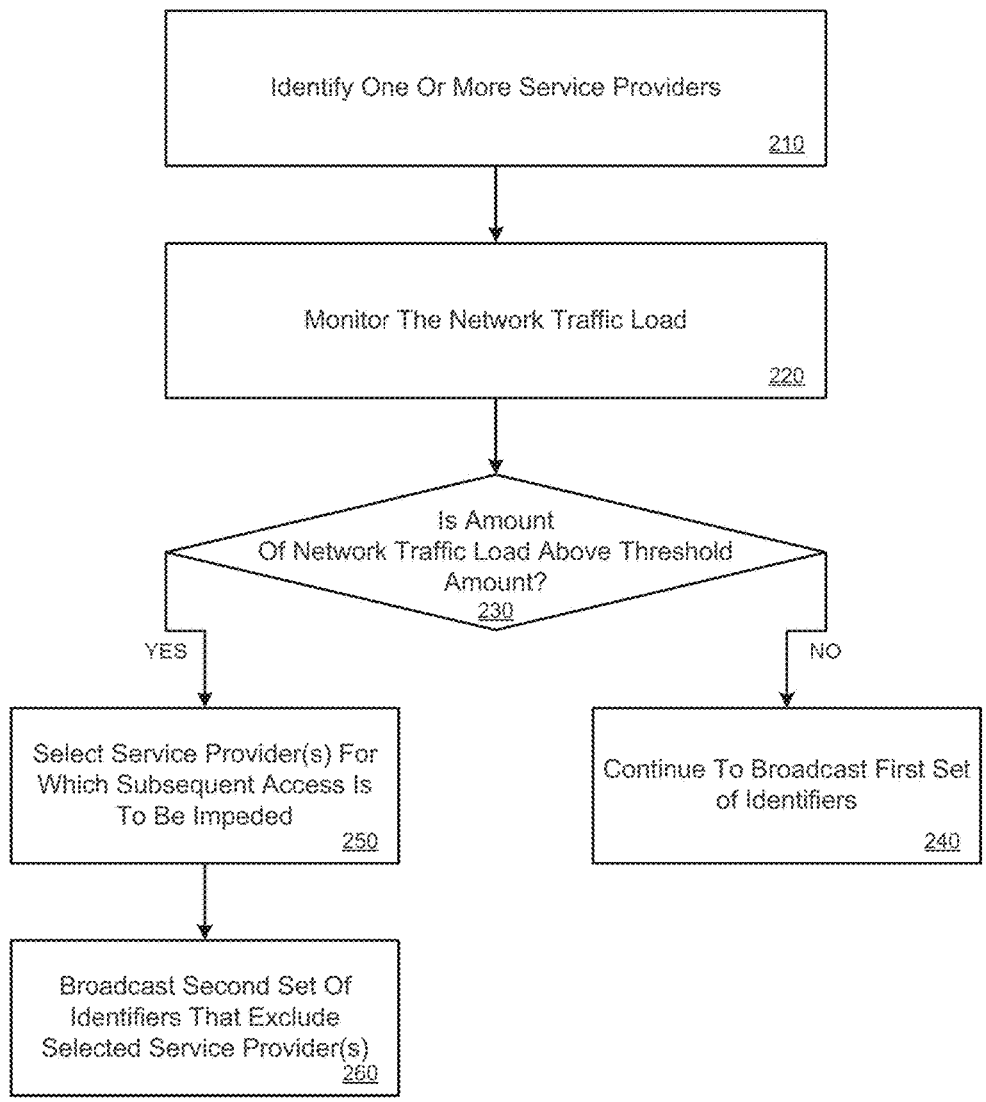
FIG. 2 illustrates an example method for operating a wireless access point.

FIG. 2 illustrates an example method for operating a wireless access point. A method such as described by FIG. 2 can be implemented using, for example, components described with FIG. 1. Accordingly, references made to elements of FIG. 1 are for purposes of illustrating a suitable element or component for performing a step or sub-step being described. Although FIG. 2 is described with respect to a wireless AP, other examples provide for the method being performed by a WLAN server or a controller.

A wireless AP can identify a group of one or more service providers that can provide access to a network for respective subscriber stations (210). The wireless AP can maintain and/or access (e.g., in its memory resource, or in a memory resource of another connected device) a list or set of service provider IDs corresponding to the group of service providers. Depending on implementation, the service provider IDs can correspond to service providers that are part of a roaming consortium. The set or list of service provider IDs can correspond to a roaming consortium list, IDs from 3GPP cellular network information, and/or IDs from a NAI Realm list.

During operation, one or more stations can be associated with and connect to the wireless AP. For example, the wireless AP can be operated by a particular service provider at a shopping mall so that multiple subscribers to the service provider (or to another service provider that is in agreement with the service provider under a roaming consortium) can connect to the wireless AP and have access to a network or the Internet. The wireless AP can monitor its network traffic load (e.g., periodically or intermittently) (220). For example, the wireless AP can monitor for a duration of time (e.g., ten seconds), a channel that the wireless AP is operating in. In another example, the wireless AP can monitor its throughput, such as the total amount of data that is transmitted and/or received by the wireless AP.

The wireless AP can make a determination when the amount of the network traffic load is equal to or above a threshold amount (230). For example, the wireless AP can make the determination by determining how much of the channel (that the wireless AP is operating in) is occupied during the duration of time (e.g., seven seconds occupied out of ten seconds). The wireless AP can compare this (e.g., 70 percent) to a threshold amount (e.g., 75 percent) to determine whether the amount of the network traffic load is equal to or above the threshold amount (e.g., in this case, the amount of the network traffic of the wireless AP is less than the threshold). In other examples, the wireless AP can make the determination by determining a total amount of data being transmitted and/or received by the wireless AP and comparing it with the threshold amount of data being transmitted and/or received (e.g., monitor data throughput).

As the wireless AP monitors its network traffic load and determines that the amount of the network traffic load is less than the threshold amount, the wireless AP broadcasts a beacon frame (or transmits a response frame in response to a probe request) that includes a first set of service provider IDs (e.g., IDs of service providers that are part of the roaming consortium) (240). For example, IDs of Service Provider A, Service Provider B, and Service Provider C can all be included with or as part of the beacon frame. Stations that have not yet associated with the wireless AP can connect with the AP provided that they subscribe to any of Service Provider A, Service Provider B, or Service Provider C. In one implementation, the wireless AP can continue to provide the first set of service provider IDs as long as the amount of the network traffic load of the wireless AP is less than the threshold amount (e.g., the wireless AP is operating in a low-load mode or is underloaded).

On the other hand, if the wireless AP determines that the amount of the network traffic load is equal to or greater than the threshold amount, the wireless AP selects one or more service provider IDs (e.g., from the roaming consortium list) for which access is to be impeded by stations that have not yet associated with the wireless AP (250). For example, the wireless AP can select the ID of Service Provider B to be excluded from being broadcasted with or as part of the beacon frame (or the response frame). The wireless AP can then broadcast a beacon frame (or transmit a response frame) that includes a second set of service provider IDs, where the second set of service provider IDs excludes the service provider IDs that have been selected to be impeded from use (e.g., the ID of Service Provider B would be excluded in the broadcast frame) (260). The wireless AP can continue to provide only the second set of service provider IDs (which have a reduced number of IDs than the first set) until the amount of the network traffic load of the wireless AP diminishes to be less than the threshold amount. Once the amount of the network traffic load is less than the threshold amount, the wireless AP can switch modes to broadcast the first set of service provider IDs.

Depending on implementation, the wireless AP can select which service provider IDs for which access is to be impeded based on various factors such as, for example, local policy and implementation, the ranking (based on importance or revenue), subscriber number, specific roaming agreement details, and/or the roaming consortium. Accordingly, the wireless AP can reduce the possibility of additional stations (that have not yet associated with the wireless AP) connecting to the wireless AP and prevent the traffic load at the wireless AP from increasing when the wireless AP is operating in a high-load (or overloaded) mode.

As an addition or an alternative, a subscriber station can receive beacon frames and/or response frames that include an ID of its service provider from two or more wireless APs (e.g., the subscriber station is within range of two wireless APs in a geographic area). The subscriber station can then use other information elements that are provided by the Hotspot 2.0 standard to select which wireless AP to associate with. For example, the subscriber station can use information elements, such as a wireless access network (WAN) metric or basic service set (BSS) loads, in order to select the appropriate wireless AP for the best network connectivity.

Figure 3:
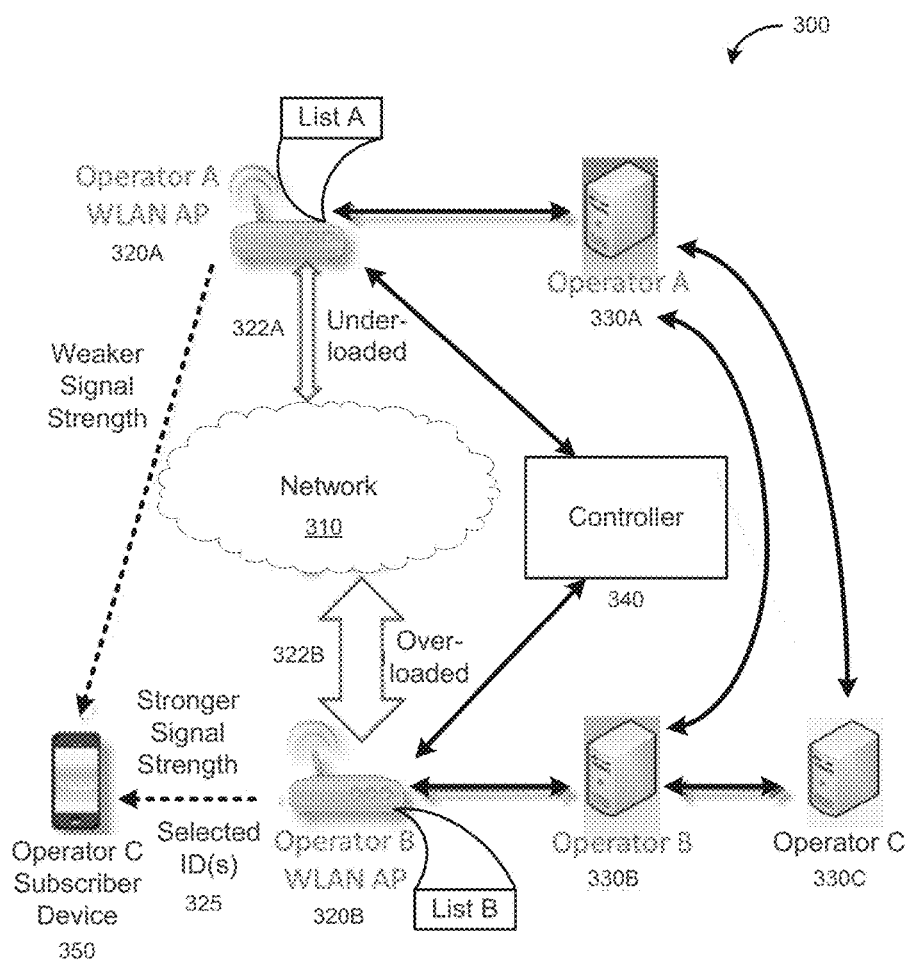
FIG. 3 illustrates an example for an implementation of a system that includes multiple wireless access points.

FIG. 3 illustrates an example for an implementation of a system that includes multiple wireless access points. System 300 can include a plurality of computing devices, such as wireless APs and/or an AP controller, that can communicate with one another (e.g., wirelessly and/or via wireline) to maximize network throughput by balancing the load among the wireless APs. In one example, the AP controller 340 (and/or the wireless APs) can implement the system and method as described in FIGS. 1 and 2.

System 300 includes a plurality of wireless APs, including a wireless AP A 320A and a wireless AP B 320B and a controller 340 that can communicate with each of the wireless APs. The wireless APs 320A, 320B are each connected to a network 310 (e.g., the Internet) and can enable appropriate subscriber stations to connect to the network 310. Although only two wireless APs 320A, 320B are shown in FIG. 3, it is to be understood that system 300 can be formed by any number of APs. In some implementations, the controller 340 can also be a wireless AP that has been designated to behave as a controlling device for the plurality of wireless APs 320A, 320B.

In the example described in FIG. 3, there are three operators or service providers, Operator A 330A, Operator B 330B, and Operator C 330C, that provide for authentication, authorization, and accounting for their services and their respective subscribers. Each of the operators 330A, 330B, 330C have roaming agreements with each other (e.g., are part of a roaming consortium) so that subscriber stations can access the respective operators or service providers through any of the three operators' network. The wireless APs 320A, 320B can each store the roaming consortium information and a roaming consortium list, e.g., List A and List B, respectively, in a memory resource. In some implementations, List A and List B can also include or correspond to the 3GPP cellular network information and/or the NAI Realm list.

As a result of the roaming agreements, multiple service providers may be accessible through a single wireless AP. For example, although wireless AP A 320A is operated and controlled by Operator A 330A, because of the roaming agreements, subscriber stations that subscribe to Operator B 330B and Operator C 330C can connect to their respective service providers using the wireless AP A 320A and the network of Operator A 330A. The controller 340 can communicate with the wireless APs 320A, 320B in order to maintain, update, and/or access the List A and List B stored at each of the wireless APs 320A, 320B. As an addition or an alternative, the controller 340 can store in its memory resource the respective lists for each of the wireless APs in system 300.

In some variations, the controller 340 can implement system 100 and/or communicate with the wireless APs 320A, 320B that each implement system 100 (as described with FIG. 1) to receive network traffic load information from each of the wireless APs 320A, 320B. By using the network traffic load information provided by the wireless APs, the controller 340 can determine which APs are operating in a low-load mode and which APs are operating in a high-load mode (e.g., according to the example of a two mode system).

In the example provided, the wireless AP A 320A is operating in an underloaded state 322A because the amount of its network traffic load is less than a threshold amount, and the wireless AP B 320B is operating in an overloaded state 322B because the amount of its network traffic load is equal to or greater than the threshold amount. The controller 340 can receive this network traffic load information (and the state the wireless APs 320A, 320B are operating in) and instruct the wireless APs 320A, 320B appropriately to achieve load balancing (e.g., instruct one or more APs to dynamically adjust their individual roaming consortium lists).

For example, a subscriber station 350, which is a subscriber of Operator C 330C and which has not yet connected to the network 310, can visit a location (e.g., a public shopping center, library, etc.) so that it is within range of the wireless APs 320A, 320B. The subscriber station 350, however, is not within range of any wireless APs that are operated by Operator C 330C. Despite not being within range of any wireless APs that are operated by Operator C 330C, if both the wireless APs 320A, 320B are underloaded (e.g., in the low-load mode as described with FIGS. 1 and 2), each of the wireless APs 320A, 320B can broadcast one or more IDs of service providers in the roaming consortium list, which include, in this example, IDs of Operators 330A, 330B, and 330C. In this manner, the subscriber station 350 can choose to connect to either of the wireless APs 320A, 320B. In some examples, because the subscriber station 350 is closer (in distance) to the wireless AP B 320B, the subscriber station 350 can choose to connect to the wireless AP B 320B instead of wireless AP A 320A.

In the example of FIG. 3, however, when one or more wireless APs of system 300 are underloaded, such as the wireless AP A 320A, and one or more are overloaded (e.g., in a high-load mode as described with FIGS. 1 and 2), such as the wireless AP B 320B, the controller 340 can use the network traffic load information from the respective wireless APs in order to perform load balancing between the wireless APs. The controller 340 can determine that the IDs of service providers in List A can be included in the beacon frame and/or the response frame because the wireless AP A 320A is underloaded. On the other hand, the controller 340 can cause the wireless AP B 320B to dynamically select one or more service providers to be limited from being accessed via the wireless AP B 320B. For example, the wireless AP B 320B can select the ID 325 of Operator C 330C to be excluded or hidden (e.g., prevent from being presented or included) in the beacon frame and/or the response frame so that the subscriber station 350 filters out the wireless AP B 320B as being an AP that it can associate with. In this manner, the subscriber station 350 can choose to connect to the wireless AP A 320A because it only knows that the wireless AP A 320A has a roaming agreement relationship with Operator C 330C (e.g., the service provider the subscriber station 350 is subscribed to). The association of the subscriber station 350 with the wireless AP A 320A (instead of the wireless AP B 320B) can relieve the imbalance of the loads across the wireless APs 320A, 320B, and can increase the bandwidth of the subscriber station 350 as well as the overall network throughput.

Hardware Diagram

Figure 4:
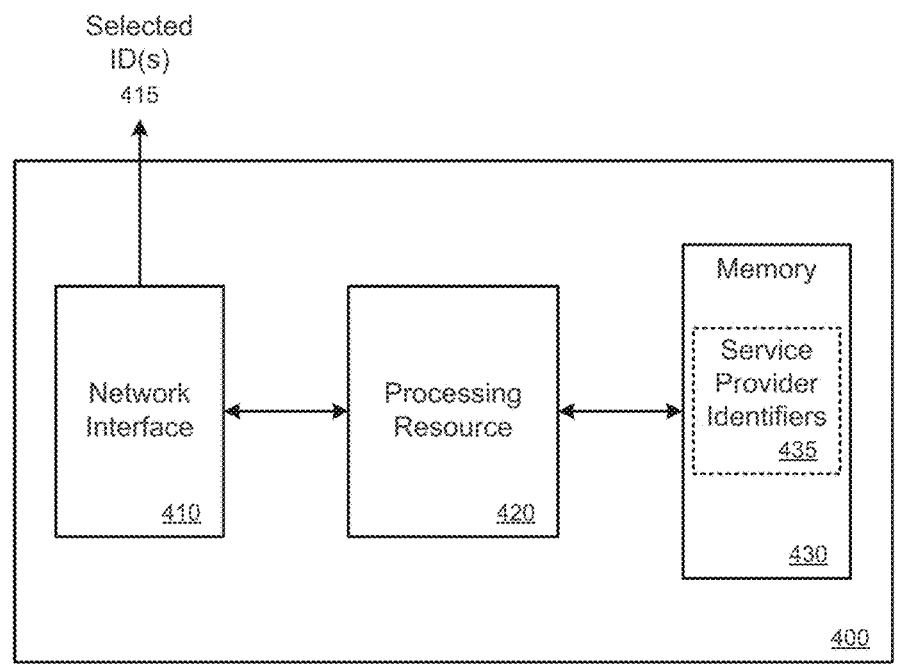
FIG. 4 is a block diagram that illustrates a wireless access point upon which examples described herein may be implemented.

FIG. 4 is a block diagram that illustrates a wireless access point upon which examples described herein may be implemented. For example, in the context of FIG. 1, system 100 may be implemented using a wireless AP such as described by FIG. 4. AP 400 includes network interface(s) 410, processing resource(s) 420, and memory resource(s) 430. The network interface 410 can be used to communicate with a WLAN server or controller, other APs, and/or associated computing devices (not shown for simplicity). The processing resource 420, which is coupled to the network interface 410 and the memory resource 430, can be any suitable processor capable of executing scripts or instructions (e.g., of one or more software programs) stored in AP 400 (e.g., within the memory resource 430). The memory resource 430 may also be used for storing temporary variables or other intermediate information during execution of instructions to be executed by the processing resource 420.

In some implementations, the memory resource 430 includes a list or table of service provider identifiers (IDs) 435 that stores identifiers of service providers that are part of a roaming consortium or have roaming agreements in place. The memory resource 430 also includes a non-transitory computer-readable medium (e.g., one or more nonvolatile memory elements, such as EPROM, EEPROM, Flash memory, a hard drive, and so on) that can store instructions that, when executed by the processing resource 420, causes the wireless AP 400 to perform functions described with FIGS. 1 through 3. For example, based on the network traffic load of the wireless AP 400, the processing resource 420 can select one or more IDs 415 to be transmitted as part of the beacon frame and/or the response frame (and select one or more IDs to be excluded). In alternative examples, hard-wired circuitry may be used in place of or in combination with software instructions to implement examples described herein. Thus, examples described are not limited to any specific combination of hardware.

It is contemplated for examples described herein to extend to individual elements and concepts described herein, independently of other concepts, ideas or system, as well as for examples to include combinations of elements recited anywhere in this application. Although examples are described in detail herein with reference to the accompanying drawings, it is to be understood that the examples are not limited to those precise descriptions and illustrations. As such, many modifications and variations will be apparent to practitioners. Accordingly, it is contemplated that a particular feature described either individually or as part of an example can be combined with other individually described features, or parts of other examples, even if the other features and examples make no mentioned of the particular feature.

What is being claimed is:

1. A method for operating a wireless access point, the method-comprising:
    identifying a group of service providers to provide access for respective subscriber devices to a network via the wireless access point, wherein the wireless access point is operating in a low-load mode;
    periodically monitoring a network traffic load of the wireless access point;
    determining that an amount of the network traffic load is above a threshold amount;
    switching the wireless access point to a high-load mode responsive to the determining the amount of the network traffic load is above the threshold amount;
    selecting a service provider from the group of service providers for impeding in response to the wireless access point switching to the high-load mode, wherein the service provider is selected based on a ranking of the selected service provider being below a rank of a non-selected service provider from the group of service providers; and
    impeding use of the selected service provider from the wireless access point by an additional subscriber not connected to the wireless access point by transmitting a response frame excluding an identifier of the selected service provider in response to receiving a probe request from the additional subscriber device.

2. The method of claim 1, wherein identifying the group of service providers includes identifying service providers that are part of a roaming consortium.

3. The method of claim 2, wherein identifying the group of service providers includes ranking the service providers by prioritizing individual service providers over other service providers.

4. The method of claim 2, wherein selecting a service provider from the group is based on an agreement specified for the roaming consortium.

5. The method of claim 1, wherein periodically monitoring the network traffic load of the wireless access point includes monitoring a channel selected by the wireless access point for a duration, and wherein determining when the amount of the network traffic load is above the threshold amount includes determining how much of the channel is occupied during the duration.

6. The method of claim 1, further comprising broadcasting a beacon frame in response to determining that the amount is above the threshold amount, wherein the beacon frame includes a set of identifiers that excludes an identifier for the selected service provider of the group of service providers.

7. The method of claim 1, further comprising:
receiving a probe request from a first subscriber device that has not yet connected to the wireless access point; and
in response to determining that the amount is above the threshold amount, responding to the probe request by transmitting a response frame including a set of identifiers that excludes an identifier for the selected service provider of the group of service providers.

8. The method of claim 7, wherein the probe request includes Generic Advertisement Service (GAS) based frame.

9. The method of claim 1, wherein impeding use of the service provider includes impeding access to an identifier for the selected service provider.

10. The method of claim 9, wherein impeding access to an identifier for the selected service provider includes hiding an identifier for the selected service provider from the additional subscriber device.

11. A wireless access point comprising:
a memory resource;
a network interface; and
a processor coupled to the memory resource and the network interface, the processor to:
identify a group of service providers to provide access for respective subscriber devices to a network via the wireless access point;
operate in a low-load mode by broadcasting a first set of identifiers, wherein each identifier in the first set of identifiers corresponds to a service provider of the group of service providers;
periodically monitoring a network traffic load of the wireless access point;
determine if an amount of a network traffic load is above a threshold amount; and
switching the wireless access point to a high-load mode responsive to the determining the amount of the network traffic load is above the threshold amount
selecting a service provider from the group of service providers for which subsequent access by subscriber devices is to be impeded in response to the wireless access point switching to the high-load mode, wherein the service provider is selected based on a ranking of the selected service provider being below a rank of a non-selected service provider from the group of service providers
broadcasting a second set of identifiers, wherein the second set of identifiers excludes an identifier for the selected provider and includes a plurality of identifiers corresponding to the non-selected service provider.

12. The wireless access point of claim 11, wherein the service providers are part of a roaming consortium specifying which service providers have roaming agreements with each other.

13. The wireless access point of claim 12, wherein the processor identifies the group of service providers by ranking the service providers by prioritizing individual service providers over other service providers.

14. The wireless access point of claim 11, wherein the processor makes the determination when the amount of the network traffic load is above the threshold amount by:
monitoring a channel selected by the wireless access point for a duration; and
determining how much of the channel is occupied during the duration.

15. A non-transitory computer readable medium storing instructions executable by a processing resource to:
determine a first amount of a network traffic load of an access point operating in a first operating mode is above a first threshold network traffic load;
switch the access point from the low-load mode to a high-load mode in response to the determination that the amount of network traffic load is above the first threshold network traffic load;
determine that a second amount of network traffic load of the access point is above a second threshold network traffic load that is different than the first threshold network traffic load; and
switch the access point from the med-load mode to a high-load mode in response to the determination that the second amount of network traffic load of the access point is above the second threshold network traffic load and
impede use of a selected service provider by an additional subscriber not connected to the wireless access point by transmitting a response frame excluding an identifier of the selected service provider in response to receiving a probe request from the additional subscriber device.

16. The non-transitory computer readable medium of claim 15, further comprising instructions to:
determine a first service provider to broadcast to a subscriber device not connected to the access point in response to the access point switch to the med-load mode; and
determine a second service provider to broadcast to a subscriber device not connected to the access point in response to the access point switch to the high-load mode.

17. The non-transitory computer readable medium of claim 15, further comprising instructions to:
determine that the first amount of network traffic load of the access point is below the first threshold network traffic load; and
keep the access point in the low-load mode in response to the determination that the first amount of network traffic load of the access point is below the first threshold network traffic load.

* * * * *